United States Patent [19]
Masarky et al.

[11] 3,858,687
[45] Jan. 7, 1975

[54] METHOD AND APPARATUS FOR LUBRICATING CONDUCTORS BEING PULLED THROUGH CONDUITS

[76] Inventors: Allyn M. Masarky, McNamara Rd., Spring Valley, N.Y. 10977; Nathaniel H. Masarky, 73 Edgewood St., Tenafly, N.J. 07670

[22] Filed: July 23, 1973

[21] Appl. No.: 381,450

[52] U.S. Cl............... 184/15 R, 174/68 G, 184/1 E
[51] Int. Cl............................................. F16n 1/00
[58] Field of Search.......... 254/134.3 FT; 174/68 C, 174/99 R; 118/404, 408; 206/56 AA; 184/1 R, 1 E, 15 R

[56] References Cited
UNITED STATES PATENTS

| | | | |
|---|---|---|---|
| 2,597,706 | 5/1952 | Couchman | 174/68 C |
| 2,924,876 | 2/1960 | Lewis | 206/56 AA |
| 3,605,251 | 9/1971 | Salerno et al. | 174/68 C |
| 3,605,947 | 9/1971 | Salerno et al. | 184/15 R |

Primary Examiner—Manuel A. Antonakas
Attorney, Agent, or Firm—Clarence A. O'Brien, Harvey B. Jacobson

[57] ABSTRACT

An elongated strip of a plurality of end to end connected elongated strip segments separated by weakened transverse zones of the strip and with each segment comprising a low profile envelope of flexible rupturable material having a lubricating fluid sealed therein. The segments include outer side surfaces provided with an adhesive coating and may be adhesively secured, either in strips each comprising a plurality of strip segments or as individual segments spaced longitudinally along and circumferentially about a cable to be pulled through a conduit, whereby as the envelopes of lubricant move through zones of heavy friction between the cable and the inner conduit surfaces the envelopes will be ruptured by the increased pressure of lubricant therein as the envelopes are flattened and the lubricant will be expressed from the envelopes to lubricate both the cable and conduit inner surfaces in the zones of heavy friction between the cable and the conduit.

6 Claims, 6 Drawing Figures

METHOD AND APPARATUS FOR LUBRICATING CONDUCTORS BEING PULLED THROUGH CONDUITS

In the electrical construction and utility fields conductors are lubricated to reduce strain, tension and heat buildup as they are pulled into and through conduits. Excessive strain, tension and heat buildup can destroy the insulating properties of the sheath of the cable and possible cause the conductor of the cable to break. As a result, lubrication fluids are conventionally applied to the outer surfaces of the cable as it is being pulled into a conduit. In the past, such lubrication has been effected by hand coating the cable as it is pulled into the conduit. Although this manner of lubricating the conduit is effective, it is extremely inefficient, wasteful and a messy method of applying lubrication. A considerable amount of the lubricant slips or falls away during the application and does not reach the area of actual need, which area may include portions of the conduit having bends and angles formed therein. Due to the messy mode of hand application of lubrication to the cable, it is an unpalatable task and often circumvented by the contractor installing the conductor or cable. Therefore, hidden electrical hazards sometimes result.

In addition to the problems of actual lubrication, the present accepted work methods are extremely uncomfortable for the man in the field who must physically scoop up a handful of lubricant compound and literally massage it on the conductor or cable being drawn into the conduit. This creates a potential health hazard due to contact dermatitis by continued exposure. It is also a considerable annoyance to work with such lubricant in cold weather. Further, when pulling conductors at high ambient temperatures, many lubricants liquefy completely and are therefore substantially lost before a lubricated portion of the cable reaches a bend or angle in the associated conduit.

It is accordingly the main object of this invention to provide a method and apparatus of effectively lubricating cables and conductors as various portions thereof reach zones of high frictional resistance while being pulled through a conduit or other outer casing.

Another object of this invention is to provide an apparatus for lubricating cables constructed in a manner whereby the lubricant to be applied to the cables may be readily and conveniently packaged and stored prior to use.

Another object of this invention is to provide an apparatus for lubricating cables which will allow lubricant to be applied to cables and conductors in a manner without the workman applying the lubricant exposing himself to the lubricant.

Yet another object of this invention is to provide a method and apparatus of effectively lubricating cables to be pulled through outer casings, without encountering any difficulties as a result of handling cables of different lengths or different diameters.

A final object of this invention to be specifically enumerated herein is to provide a method and apparatus for lubricating cables to be pulled through conduits and which will conform to conventional forms of manufacture, be of simple construction and easy to use so as to provide a lubricant apparatus and method which will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 5:
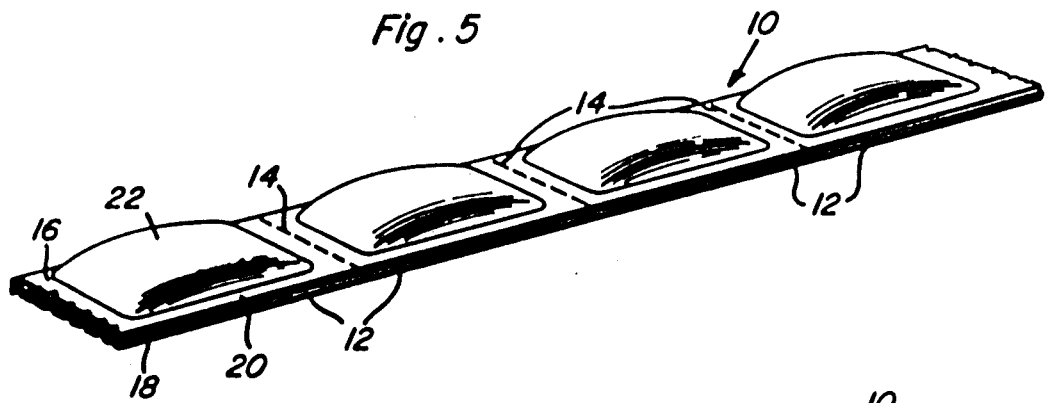
FIG. 5 is a perspective view of a strip section of a plurality of lubricating package segments.

Referring now more specifically to the drawings and to FIG. 5 in particular, a strip structure is referred to in general by the reference numeral 10 and comprises a plurality of end to end connected elongated strip segments 12 separated by transversely extending weakened zones 14 of the strip 10. The weakened zones 14 are defined by perforated zones of the strip 10.

Each of the segments 12 comprises a closed envelope including superposed sheets or sides 16 and 18 sealingly joined together along corresponding marginal portions 20 in any convenient manner. The sheets 16 and 18 are constructed of a flexible rupturable material and each sheet 16 includes a low profile bulbous portion 22 spaced inwardly of the corresponding marginal portions 20. A supply of suitable fluid lubricant 23 is contained within each envelope defining segment 12 and the outer surface of the sheet 18 is provided with an adhesive coating 24 covered by means of a protective cover sheet 26 which is readily removable from the adhesive coating 24.

Figure 1:
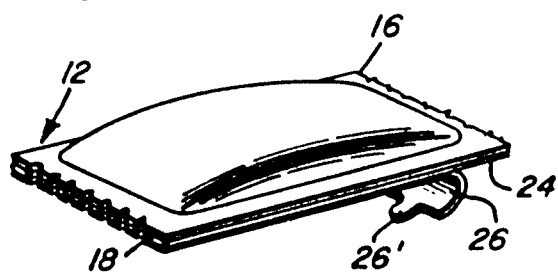
FIG. 1 is a perspective view of a strip segment of the apparatus by which lubricant may be applied to the outer surfaces of cables or conductors to be pulled through conduits or other outer casings and with the protective sheath covering the adhesive side of the segment partially peeled away from the segment.
Figure 2:
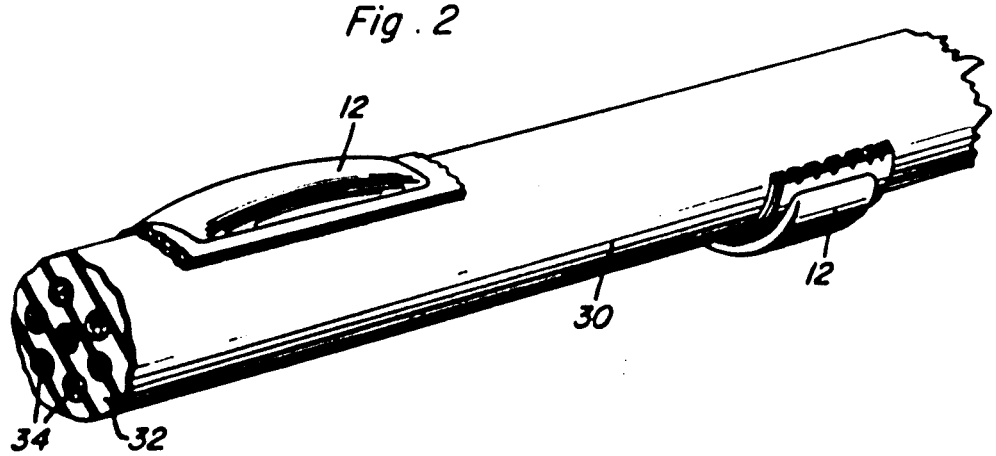
FIG. 2 is a fragmentary perspective view of a cable with two of the lubricating strip segments applied thereto.
Figure 3:
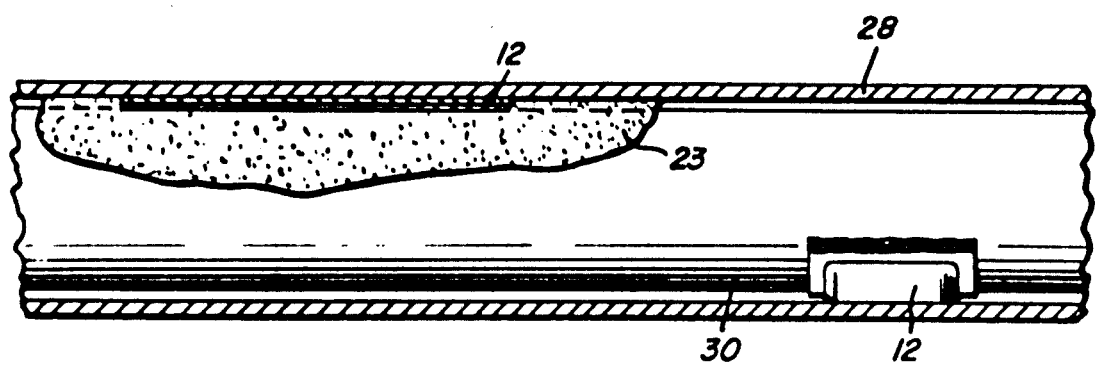
FIG. 3 is a fragmentary sectional view taken substantially upon a plane passing along the longitudinal centerline of an outer casing through which the cable section illustrated in FIG. 2 is being pulled and with one of the lubricant package segments in a flattened condition with the lubricant having been expressed therefrom.

With attention now invited to FIG. 3 of the drawings, there may be seen an outer conduit or other casing 28 through which a cable 30 is being pulled. The cable 30 includes an outer insulation material 32 and a plurality of inner conductors 34. Of course, cables of other types may also be pulled through the conduit 28. A pair of segments 12 have been adhesively secured to the conduit 30 as best shown in FIG. 2 of the drawings and as may be seen from FIG. 3 of the drawings the lengthwise extending segment 12 has been ruptured by heavy friction with the interior wall surfaces of the casing 28 and the lubricant 23 has been expressed therefrom. Of course, the transversely extending segment 12 illustrated in FIG. 3 has not yet been ruptured.

As the cable is drawn into the conduit 28, individual segments 12 may be torn from the strip 10 and the cover sheets 26 may be removed from the segments 12 in order that the latter may be readily adhesively secured to the outer surfaces of the cable 30.

Figure 4:
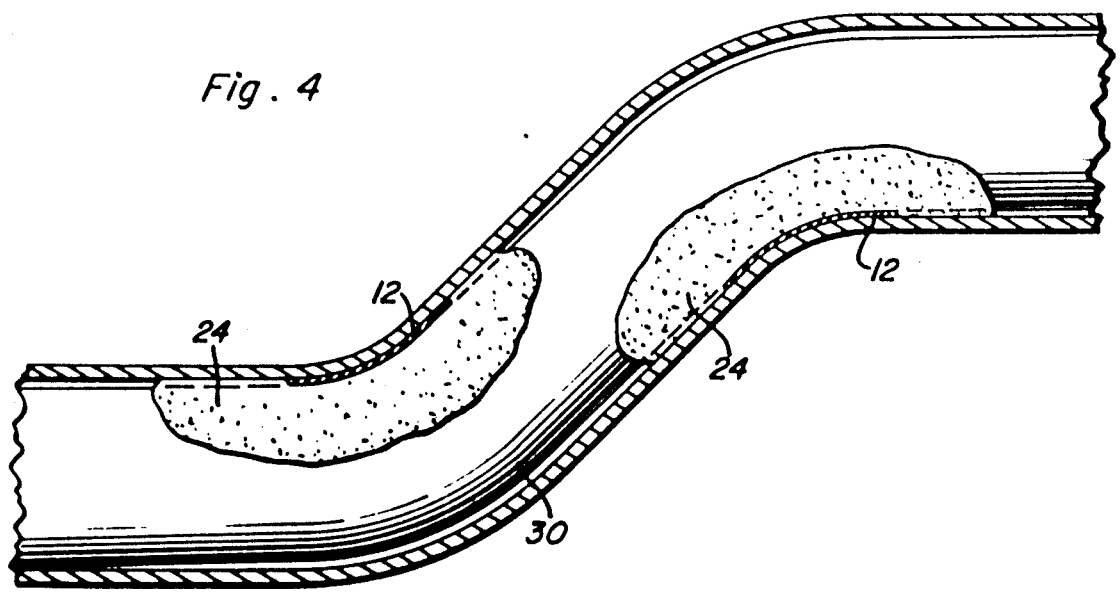
FIG. 4 is a longitudinal sectional view similar to FIG. 3 but illustrating the manner in which lubricant may be expressed from both of the segments applied to the cable as the cable is pulled through a tortuous portion of the conduit or other outer housing.
Figure 6:
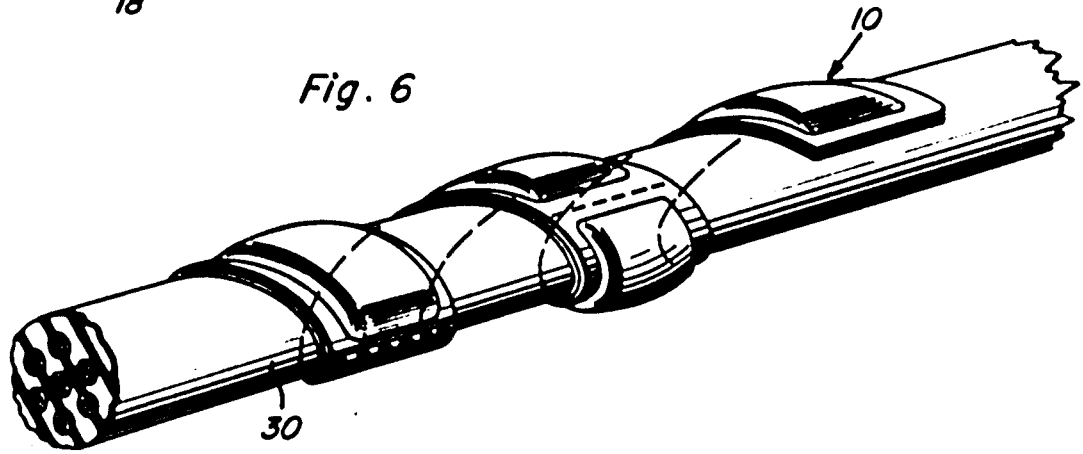
FIG. 6 is a perspective view of another cable section having a strip of lubricant package segments wound thereabout in a helical path.

With attention now invited more specifically to FIG. 4 of the drawings, it may be seen that both the segments 12 may be ruptured so that the lubricant 23 is expressed therefrom as the cable 30 is pulled through a tortuous portion of the conduit 12. Further, as may be seen from FIG. 6 of the drawings, a section of the strip 10 may be wound about the cable 30 in a helical path at longitudinally spaced points along the cable 30.

In any event, the segments 12 may be readily handled and applied to the cable 30 as well as stored and shipped to a point of use. Still further, any desired lubricants may be contained within the segments 12 and may even include additives which may be detected from the exterior of the conduit 12 so that additional segments specifically positioned on the cable 30 may be applied to latter portions pulled into the conduit 28 in order to ensure lubrication of the interior of problematical zones thereof.

The envelopes or pouches 12 are to be manufactured of any compatible plastic, fibre, paper, resin impregnated fibre or paper, cloth, natural or synthetic foam of any film or laminated film that might by desirable or required for the application, being compatible with both the conductor insulation and the contained lubricant. The selection of the film or laminate is not to be a restrictive one in order to achieve the desired tensile strength and rupture properties as the type of film and/or structure of the laminate would be contingent upon the anticipated use of the pouch, where a light duty application might require one type of film, a heavy duty application would require a stronger or laminated film.

In design, the protective sheet or backing 26 is provided with a "tab" 26' or an area larger than the surface it is protecting. This is intended to give the user a comfortable grip on the backing in its removal without resorting to the use of a knife, screwdriver or any other implement in order to remove the backing.

Further, the user could, by wrapping several small conductors, use the pouch as a band, tape or "tie" to secure the several small conductors, keeping them together, while pulling and lubricating them at one time, thereby creating an easier, simpler method for this type of pulling installation.

Also, through the use of the pouch lubricant, the problem of pulling a conductor through flooded or partially water-filled conduits can be overcome. As many existing conduits normally collect water, present means of lubrication are inefficient, as the collected water washes off the applied lubricant when the conductor passes through the water, leaving little or no lubricant on the conductor when it reaches the points of stress. Through the use of the pouch lubricant, the pouches will pass through a submerged area without loss of compound and will rupture only when reaching the point of stress and at that point, releasing the contained lubricant.

For efficient distribution of the lubricant, pouches varying in structural thicknesses could be applied. Similarly, it would be possible to create a "piggy-back" effect, using two or more bag pouches, either manufactured in multiples or manually placed on each other. This consideration is presented as pouches of different tensile strengths could be used, creating an effect of one rupturing prior to the second for more efficient lubrication.

In addition to the above described pouch, it is noted that a pouch could be constructed with a pre-weakened area, which would offer a controlled release of the lubricant when such application warrants. The pouch could also be made with an exterior film, perforated and protected by a removable sheet, removed prior to use to release the lubricant in this manner rather than awaiting stress to rupture, prior to release.

The pouch also could contain natural or synthetic foam or fibrous material, which in turn would act as a "wipe" with the lubricant impregnated in some types of applications.

In such cases, it would be possible to rely on the stress to rupture the pouch or the design could be varied to have the foam structure coated with a self-adhering film which would be applied in the accepted manner to the conductor, with a face cover that could be stripped off, exposing the impregnated pad, prior to entering the conduit and lubricating the conduit wall as it is pulled along.

As an alternate method of using the pouch lubricant, rather than adhering the pouch to the conductor, the user could adhere the pouch to a glove (made of natural or synthetic material), and then grasp the conductor in the gloved hand to lubricate the conductor. Alternately, the pouch could be placed in a perforated pocket in the palm of the glove, thereby releasing the lubricant through the perforated pocket onto the conductor. In a similar concept, the glove could be made with a double palm and the user could inject the palm area with the lubricant, reseal the palm pouch and lubricate the conductor in the usual manner.

It is noted that this method of lubrication need not be limited to electrical wire and cable installations into conduits, but would also find favor in other areas of application such as bridge building, where steel cables must be lubricated during installation and other applications where there is a problem of delivery of the lubricant to an area of stress, generally inaccessible during installation.

The described pouches, being hermetically sealed, present a preferred packaging container as the contained lubricant will not dry out in storage. This prevents a problem associated with presently packaged compounds. Economies will be effected through the use of the pouch as only a sufficient number of pouches would be used for a given installation and this would result in a "no waste or loss" status.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. The method of lubricating a cable as it is pulled through a curved portion of an extended length conduit section spaced from the opposite ends of said section, said method comprising the step of attaching low profile envelopes of flexible and rupturable material having lubricant disposed therein to the outer surface of the cable at points spaced longitudinally therealong and circumferentially thereabout and thereafter pulling the cable through the conduit, whereby as the envelopes of lubricant move through zones of heavy friction between the cable and inner conduit surfaces, such as said curved portion of said conduit, the envelopes will be ruptured by the increased pressure of lubricant therein and the lubricant will be expressed from the envelopes to lubricate both the cable and conduit inner surface in said zones of heavy friction.

2. The method of claim 1 wherein said method includes the step of adhesively securing said envelopes to said cable.

3. In combination with an extended length cable to be pulled through an extended length conduit section including at least one curved portion intermediate its opposite ends, a plurality of closed generally flat envelopes of flexible rupturable material, said envelopes being at least partially filled with lubricant, said envelopes being spaced along and about said cable and adhesively secured thereto.

4. The combination of claim 3 wherein each of said envelopes comprises a pair of opposite side sheets of said rupturable material including corresponding peripherally extending marginal portions sealingly secured together, one of said side sheets of each envelope being substantially planar, the other side sheet of each envelope defining a low profile bulbous portion inwardly of the marginal portion thereof in which said lubricant is disposed.

5. The combination of claim 3 wherein each of said envelopes is of a length greater than its width.

6. The combination of claim 3 wherein each envelope comprises a single segment of a long strip of a plurality of end to end connected elongated segments separated by weakened transverse zones of said strip.

* * * * *